June 9, 1953 K. WILFERT 2,641,482
WHEEL SUSPENSION MECHANISM FOR ROAD VEHICLES
Filed June 29, 1951

Karl Wilfert, Inventor
By Austin, Dicke, Wilhelm & Padlon
Attorneys

Patented June 9, 1953

2,641,482

UNITED STATES PATENT OFFICE 2,641,482

WHEEL SUSPENSION MECHANISM FOR ROAD VEHICLES

Karl Wilfert, Stuttgart-Degerloch, Germany, assignor to Daimler-Benz Aktiengesellschaft, Stuttgart-Unterturkheim, Germany Application June 29, 1951, Serial No. 234,255
In Germany July 1, 1950

5 Claims. (Cl. 280—106.5)

1

My invention relates to a wheel suspension mechanism for road vehicles. More particularly, my invention pertains to a mechanism of the kind in which a rigid axle carried by a pair of wheels is guided relatively to the frame by longitudinally extending pivotal arms, the frame, or the self-sustaining body of the vehicle, being suspended on a transverse leaf spring situated at a comparatively high level above the axle. A wheel suspension of that type results in a comparatively high location of the axis of transverse inclination of the vehicle body, such axis extending preferably through the center of gravity of the body. As a result, the vehicle will, when running through a curve, display but little or no tendency to incline outwardly. However, an axle suspension of such type is highly sensitive against transverse shocks that might act on the wheels in operation.

It is an object of the present invention to provide means which will absorb such transverse shocks, but will nevertheless at any time insure the proper alignment of the axle relative to the body of the vehicle. It is another object of the present invention to provide simple and reliable means for the suspension of an axle by a leaf spring located at a high level, which means do not require lubrication or any servicing.

In the accompanying drawings, I have illustrated a preferred embodiment of my invention.

Figure 1:
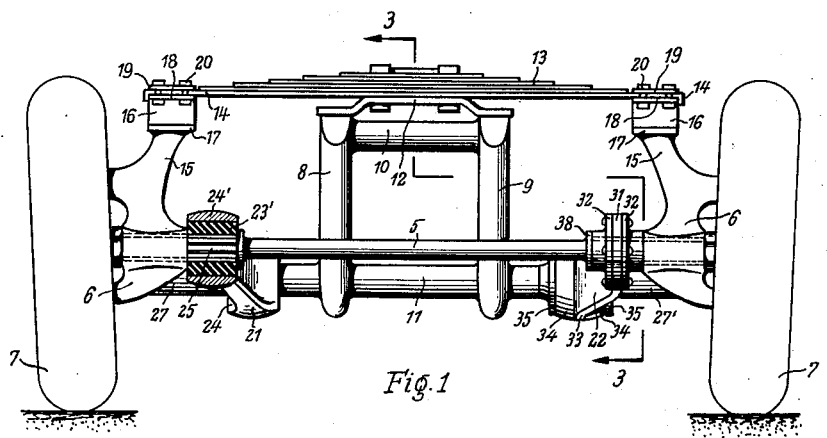
Figure 2:
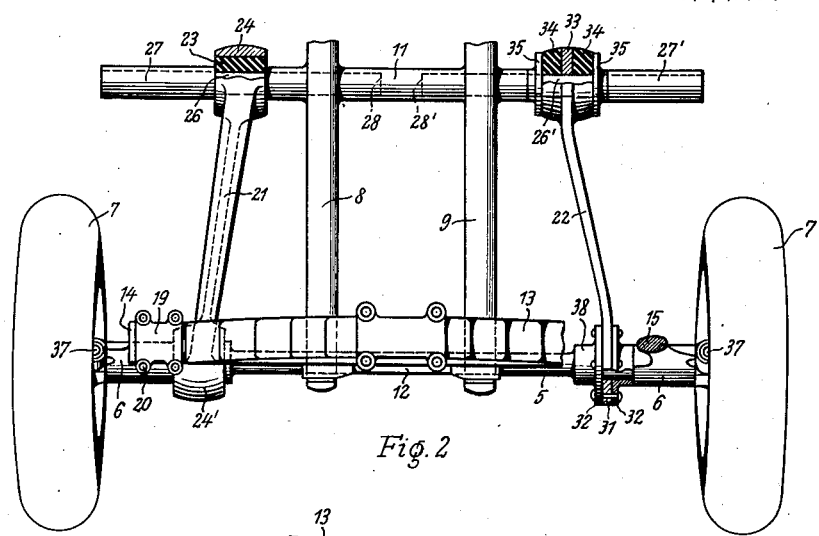
Figure 3:
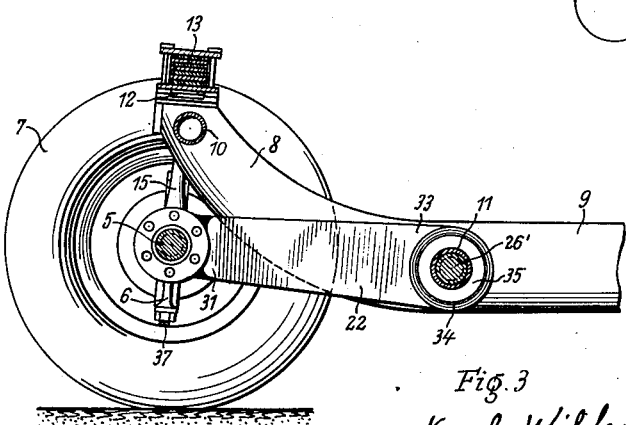

Fig. 1 is the front view of a chassis of a road vehicle equipped with my improved wheel suspension, Fig. 2 is a partial plan view of the chassis illustrated in Fig. 1 partially shown in section, and Fig. 3 is the section taken along the line 3—3 of Fig. 1.

The wheel suspension mechanism shown in the drawings comprises a rigid front axle carried by a pair of wheels 7 and includes a central section 5 of reduced circular or other cross section and two brackets 6 attached to the ends thereof. Each of said brackets 6 carries a king pin 37 that serves in the orthodox or usual manner to mount the wheel 7 for swivel motion, suitable means, not shown, being provided to steer the front wheels 7 of the vehicle.

The chassis of the vehicle includes a frame comprising two longitudinal tubular frame members 8, 9 and a tubular transverse member 11 rigidly connected thereto. The members 8 and 9 are curved upwardly and terminate above the axle 5 substantially at the level of the tops of the wheels 7 and are connected by a tubular member 10. Suitable means are provided for

2 mounting a transverse leaf spring 13 on the ends of the frame members 8, 9, such means comprising a bracket 12 which is welded or otherwise connected to the members 8 and 9 and connected with the leaf spring by suitable bolts. The ends of the leaf springs rest on rubber blocks 16 mounted on upwardly extending arms 15 of the brackets 6. Each of the rubber blocks 16 is fitted with a top plate 18 firmly connected thereto, preferably by a vulcanizing process or by a suitable adhesive. In a similar manner the blocks 16 are firmly connected with top plates 17 integral with the upwardly extending arms 15 of the brackets 6. The ends 14 of the leaf spring 13 are clamped between the plates 18 and counterplates 19 by suitable bolts 20 and nuts.

The composite front axle 5, 6 is guided relatively to the frame of the vehicle for upward and downward motion by a pair of arms 21, 22 mounted on the transverse frame member 11 for pivotal motion about the axis thereof. In the embodiment shown the arm 21 has an I-shaped cross section and is formed integral with eyes 24 and 24' at its ends.

The tubular transverse frame member 11 is formed with internal longitudinal grooves and the splined ends 28, or 28' respectively, of pins 26 and 26' are inserted therein and projecting therefrom. A rubber sleeve 23 positioned within the eye 24 of arm 21 is mounted on the pin 26 and biased radially. Preferably, the rubber sleeve firmly adheres to the inner face of the eye 24 and to the pin 26, such adherence being produced by a vulcanizing process or by a suitable adhesive in a manner well known in the art. The outer end 27 of the pin 26 has a large diameter. It serves for the attachment of the body of the vehicle. Suitable detachable means not shown are provided to hold the pins 26 and 26' firmly in position within the frame member 11. Similarly, a rubber sleeve 23' is inserted within the eye 24' and surrounds a splined portion 25 of the axle 5 firmly adhering thereto and to the inner face of the eye 24', such sleeve 23' being likewise biased radially.

The other guiding arm 22 is formed by a steel leaf spring placed on edge. The front end 31 of the arm 22 has a hole through which the axle 5 extends and is positioned between two flanged hub members 32 mounted on the axle 5 between a collar 38 thereof and the associated bracket 6, suitable circumferentially distributed bolts and nuts being provided to firmly clamp the end 31 of arm 22 between the two hub members 32. The latter are suitably secured against rotation on the axle 5, for instance by a splined fit. In this manner the braking couple or any other torque acting on the axle 5 will be transmitted to the arm 22. The rear end 33 of arm 22 is likewise provided with a hole through which the splined pin 26' extends which has its end 28' inserted in and suitably attached to the transverse frame member 11. Two annular rubber cushions 34 are inserted between and adherently connected with the end 33 of arm 22 and hub members 35 splined on the pin 26', such adherence being produced by a suitable vulcanizing process or an adhesive in a manner well known in the art.

Owing to the flexibility of the arm 22 and of the rubber cushions 16, 23, 23' and 34, the front axle 5 is permitted a certain lateral displacement relative to the frame enabling the axle to yield to any shocks exerted on the wheels of the vehicle. At the same time such shocks will be effectively absorbed by the large rubber cushions. Preferably, such flexibility of the axle is so limited that the maximum displacement occurring in practical operation to either side will not exceed 1:1¼ inch. Nevertheless, the axle will be securely guided and such guidance will protect the transverse leaf spring 13 from any torsional stresses. It will be noted that the axle suspension mechanism described does not require any lubrication or any servicing.

While my invention has been described hereinabove with reference to a preferred embodiment thereof, it is capable of numerous modifications within the scope of the appended claims. Thus it is applicable to the suspension of the rear axle as well as to the front axle, no matter whether the wheels are driven or are not driven.

What I claim is:

1. In a wheel suspension mechanism for a road vehicle, the combination comprising an axle, a frame having a frame portion extending upwardly to a level above said axle, a pair of wheels carrying said axle, guiding arms mounted on said frame for pivotal movement about a transverse axis thereof and connected to said axle and adapted to guide the same relatively to said frame for upward and downward motion, brackets on said axle projecting upwardly therefrom, rubber blocks on said brackets, and a transverse spring firmly mounted intermediate its ends on said frame portion and having its ends connected to said rubber blocks, said ends and blocks lying at the height of the center of gravity of the vehicle.

2. In a wheel suspension mechanism for a road vehicle, the combination comprising an axle, a pair of wheels carrying said axle, a frame having a portion extending to a point located above the median portion of said axle substantially at the level of the top of said wheels, brackets projecting upwardly from the ends of said axle, rubber blocks on said brackets, the top faces of said rubber blocks being positioned substantially at said level, a transverse leaf spring resting on said rubber blocks and connected to said frame portion, a pair of arms mounted on said frame for pivotal movement about a transverse axis and connected to said axle near said brackets and adapted to guide said axle relatively to said frame for upward and downward motion, and rubber cushions being interposed between the ends of at least one of said arms and said frame and said axle.

3. In a wheel suspension mechanism for a road vehicle, the combination comprising an axle, a pair of wheels carrying said axle, a frame having a portion extending to a point located above the median portion of said axle substantially at the level of the top of said wheels, brackets projecting upwardly from the ends of said axle, rubber blocks on said brackets, the top faces of said rubber blocks being positioned substantially at said level, a transverse leaf spring resting on said rubber blocks and connected to said frame portion, a pair of arms mounted on said frame for pivotal movement about a transverse axis and connected to said axle near said brackets and adapted to guide said axle relatively to said frame for upward and downward motion, rubber cushions being interposed between the ends of one of said arms and said frame and said axle, and means for rigidly connecting the other arm to said axle, said last mentioned arm being flexible in a direction transversely of said vehicle.

4. In a wheel suspension mechanism for road vehicles, the combination comprising an axle, brackets mounted on the ends thereof, king pins mounted in said brackets, a pair of wheels, each wheel being pivotally connected to said axle by means of said king pin for swivel motion, a frame including two longitudinal members and one transverse member connected thereto, the ends of said longitudinal members being bent upwardly terminating substantially at the level of the top of said wheels, a transverse leaf spring, means for mounting said transverse spring on the ends of said longitudinal members above said axle, means for connecting the ends of said leaf spring to the tops of said brackets, said means including rubber cushions, a pair of arms mounted on said transverse member of the frame for pivotal motion about the axis thereof and connected to said axle and adapted to guide the same relative to said frame for upward and downward motion, one of said arms being rigidly connected to said axle and being flexible transversely of said frame, and rubber cushions interposed between said arms and said transverse member of the frame, the flexibility of said last mentioned arm and of said rubber cushions being such as to permit a lateral displacement of said axle relative to said frame in practical operation up to about 1¼ inch.

5. In a wheel suspension mechanism for a road vehicle, the combination comprising an axle, a frame having a frame portion extending upwardly to a level above said axle, a pair of wheels carrying said axle, guiding arms mounted on said frame for pivotal movement about a transverse axis thereof and connected to said axle and adapted to guide the same relatively to said frame for upward and downward motion, brackets on said axle projecting upwardly therefrom, rubber blocks on said brackets, and a transverse spring firmly mounted intermediate its ends on top of said frame portion, said ends being connected to said rubber blocks at a height substantially the same as the center of gravity of the vehicle.

KARL WILFERT.

References Cited in the file of this patent

UNITED STATES PATENTS

| Number | Name | Date |
|---|---|---|
| 1,249,696 | Waite | Dec. 11, 1917 |